(12) United States Patent
Choi et al.

(10) Patent No.: US 9,205,565 B2
(45) Date of Patent: Dec. 8, 2015

(54) TONGUE MODULE FOR ROBOT

(75) Inventors: Dong Woon Choi, Seoul (KR); Dong Wook Lee, Incheon (KR); Ho Gil Lee, Ansan-si (KR); Duk Yeon Lee, Ansan-si (KR); Hyun Sub Park, Hwaseong-si (KR)

(73) Assignee: Korea Institute of Industrial Technology (KR)

( * ) Notice: Subject to any disclaimer, the term of this patent is extended or adjusted under 35 U.S.C. 154(b) by 0 days.

(21) Appl. No.: 14/007,642

(22) PCT Filed: Mar. 30, 2012

(86) PCT No.: PCT/KR2012/002360
§ 371 (c)(1),
(2), (4) Date: Jul. 10, 2014

(87) PCT Pub. No.: WO2012/134212
PCT Pub. Date: Oct. 4, 2012

(65) Prior Publication Data
US 2014/0345413 A1    Nov. 27, 2014

(30) Foreign Application Priority Data

Mar. 31, 2011 (KR) .................. 10-2011-0029254

(51) Int. Cl.
*A63H 3/28* (2006.01)
*B25J 11/00* (2006.01)

(52) U.S. Cl.
CPC ........ *B25J 11/0015* (2013.01); *Y10T 74/20317* (2015.01); *Y10T 74/20323* (2015.01)

(58) Field of Classification Search
USPC ......... 446/300, 301, 329, 337, 338, 376, 391, 446/395; 434/263, 267, 270
See application file for complete search history.

(56) References Cited

U.S. PATENT DOCUMENTS

| | | | | |
|---|---|---|---|---|
| 1,486,101 | A | * | 3/1924 | Megorden ............... 446/289 |
| 3,236,006 | A | * | 2/1966 | Carroll ................... 446/341 |
| 4,263,742 | A | * | 4/1981 | Terzian .................. 446/340 |
| 4,689,033 | A | * | 8/1987 | Droller et al. .......... 446/183 |
| 5,141,464 | A | * | 8/1992 | Stern et al. ............. 446/338 |
| 5,876,263 | A | * | 3/1999 | DeCesare et al. ...... 446/330 |
| 6,220,921 | B1 | * | 4/2001 | Kim ....................... 446/308 |
| 7,901,265 | B1 | * | 3/2011 | Cameron et al. ....... 446/330 |
| 2010/0105278 | A1 | * | 4/2010 | Lee et al. ............... 446/330 |

* cited by examiner

*Primary Examiner* — Kurt Fernstrom
(74) *Attorney, Agent, or Firm* — Cooley LLP

(57) ABSTRACT

The present invention relates to a tongue module for a robot which is installed in an android face robot formed to have a similar external appearance to a human face and to express feelings. The tongue module includes a tongue body made of composite silicon material and formed to have smooth texturing; a front and rear driving unit configured to move the tongue body in front and rear directions by using a crank arm and a first servo motor; an up and down driving unit configured to bend the tongue body in up and down directions by using wires and a second servo motor; and a linear rail assembly configured to move the tongue body in a straight line.

5 Claims, 4 Drawing Sheets

TONGUE MODULE FOR ROBOT

TECHNICAL FIELD

The present invention relates to a tongue module for a robot installed in an android face robot which has an external appearance similar to a human face and expresses feelings and, more particularly, to a tongue module for a robot, in which a tongue body is moved in front and rear and up and down directions by two servo motors, thereby enabling a simple structure and a small size and also enabling the android face robot to make various facial expressions.

BACKGROUND ART

A robot is chiefly divided into an industrial robot used in an industrial spot and a human like robot having a similar form to a human being. The industrial robot performs a task through remote control or performs a simple repetition task having the degree of freedom of 1~2 or a task having the degree of freedom of 3 using electronic control in an environment in which a human being finds difficult to perform a task. The industrial robot is used as a worker for realizing a Flexible Manufacturing System (FMS).

The human like robot has a human like form and corresponds to the ultimate object of robot technology. The human like robot is chiefly divided into a humanoid robot and an android robot. The humanoid robot refers to a robot which has a similar outward appearance to a human being, has two arms, two legs, and the head, and can move to some extent. The humanoid robot includes ASIMO developed by Honda Motor Co., Ltd. in Japan, HUBO developed by KAIST in Korea, and so on.

The android robot refers to a robot looking like a human being, and it is rarely distinguished from a human being in an appearance. Although the android robot has not yet been fabricated, research into a robot capable of expressing feelings is in progress. Accordingly, various robots are being developed. Robots developed so far express metal states, feelings, etc. through mechanical faces after a human's face. The robots include Kissmet simulated from the muscle of a face mechanically and developed by MIT, SAYA fabricated by Tokyo University of Japan so that it is similar to a human' skin using silicon, and so on.

Only the facial part of the android robot is called an android face robot. As shown in FIG. 1, the android face robot is designed to be similar to a human being in order to implement various expressions of feelings. The android face robot includes the skin, a facial skeleton, and an appliance unit for moving the facial muscle. That is, unlike other robots having a casing made of steel, the android face robot maintains its shape by fixing an outside skin 110 made of soft material, such as silicon or hot foam, to an inside skin 120 corresponding to a facial skeleton by using an adhesive so that the android face robot has the skin similar to an actual human skin. Furthermore, an appliance unit 130 corresponding to the brain of a human being is organically connected to and placed within the inside skin 120 and is formed of a microprocessor, sensors, a motor, and an actuator so that it can implement a face muscle motion and expressions of feelings. The appliance unit 130 is connected to the inside skin by using a wires or a thread having less rigidity. When the appliance unit 130 moves, the inside skin 120 and the outside skin 110 are also designed to move according to the motion of the appliance unit 130. The inside skin 120 includes a lower inside skin 120a forming the jaws and an upper inside skin 120b forming a facial part other than the jaws.

In this android face robot, means for making facial expressions includes a mouth structure for implementing the motion of the mouth. The mouth structure of the android face robot is designed to be almost similar to the mouth structure of a human being in order to give a feeling of intimacy with a human being. Furthermore, the mouth structure of the android face robot is designed to move an upper lib (i.e., another element to make facial expressions).

The conventional android face robot, however, does not have a tongue that is one of several elements for making facial expressions or has only an imitation tongue having a simple form. Accordingly, the conventional android face robot is problematic in that it finds difficult to make more various facial expressions.

There are devices that simulate the motion of a tongue, but most of the devices have problems in that the devices are difficult in maintenance and repair and require a high production cost because they have complicated structures and that the devices cannot be applied to the android face robot owing to its large size.

DISCLOSURE OF INVENTION

Technical Problem

Accordingly, the present invention has been made in view of the above problems occurring in the prior art, and an object of the present invention is to provide a tongue module for a robot, in which a tongue body can be moved in front and rear and up and down directions by using a simple 2-degree-of-freedom driving apparatus, thereby making various facial expressions when the tongue module is installed in an android face robot.

Another object of the present invention is to provide a tongue module for a robot, in which the tongue body is formed to bend in up and down directions while having similar texturing to an actual tongue, so that the tongue module is operated like an actual tongue and is excellent in an appearance.

Yet another object of the present invention is to provide a tongue module for a robot, in which the 2-degree-of-freedom driving apparatus is simply constructed by using step motors, crank arms, rotation arms, and wires, so that the tongue module can be applied to current android face robots and a production cost can be reduced owing to a small size.

Solution to Problem

To achieve the above objects, the present invention provides a tongue module for a robot which is installed in an android face robot formed to have a similar external appearance to a human face and to express feelings. The tongue module includes a tongue body made of composite silicon material and formed to have smooth texturing; a front and rear driving unit configured to move the tongue body in front and rear directions by using a crank arm and a first servo motor; an up and down driving unit configured to bend the tongue body in up and down directions by using wires and a second servo motor; and a linear rail assembly configured to move the tongue body in a straight line.

Furthermore, in accordance with the tongue module for a robot according to the present invention, the tongue body includes a body frame made of plastic material and formed to be bend, an outside skin made of composite silicon material surrounding the body frame and configured to form an external appearance of the tongue, and a plurality of angle control holders formed in the body frame at specific intervals and formed to fix the wires so that the body frame is bent in up and down directions.

Furthermore, in accordance with the tongue module for a robot according to the present invention, the front and rear driving unit includes the first servo motor installed in a fixed bracket included within a facial robot, the crank arm configured to convert a rotational motion, generated by the first servo motor, into a straight-line motion so that the tongue body is moved in front and rear directions, and a movable bracket connected to the tongue body and moved by the crank arm in front and rear directions.

Furthermore, in accordance with the tongue module for a robot according to the present invention, the up and down driving unit includes the second servo motor installed in the movable bracket, the wires configured to surround the end part of the tongue body, engaged with the upper and lower sides of the angle control holders provided in the tongue body, and configured to bend the tongue body according to a position, and a rotation arm installed in the shaft of the second servo motor and configured to have both ends connected to both ends of the wire.

Furthermore, in accordance with the tongue module for a robot according to the present invention, the linear rail assembly includes a linear guidance unit installed in one side of the fixed bracket and the movable bracket and a linear bar installed in the other side of the fixed bracket and the movable bracket and slidingly inserted into the linear guidance unit.

Advantageous Effects of Invention

The tongue module for a robot according to the present invention is advantageous in that the tongue module can simulate the motion of an actual tongue because it has a similar motion to the actual tongue by moving the tongue body in front and rear directions using a front and rear driving unit and bending the tongue body in up and down directions using an up and down driving unit.

Furthermore, in accordance with the tongue module for a robot according to the present invention, there are advantages in that a structure is simple and a maintenance and repair cost is reduced because a tongue body is moved in front and rear and up and down directions by using two servo motors, two crank arms, and two wires.

Furthermore, the tongue module for a robot according to the present invention is advantageous in that the tongue module can be reduced in size owing to a simple structure and applied to current android face robots and a production cost is reduced.

MODE FOR THE INVENTION

A tongue module for a robot according to the present invention is described below with reference to the accompanying drawings.

Figure 1:
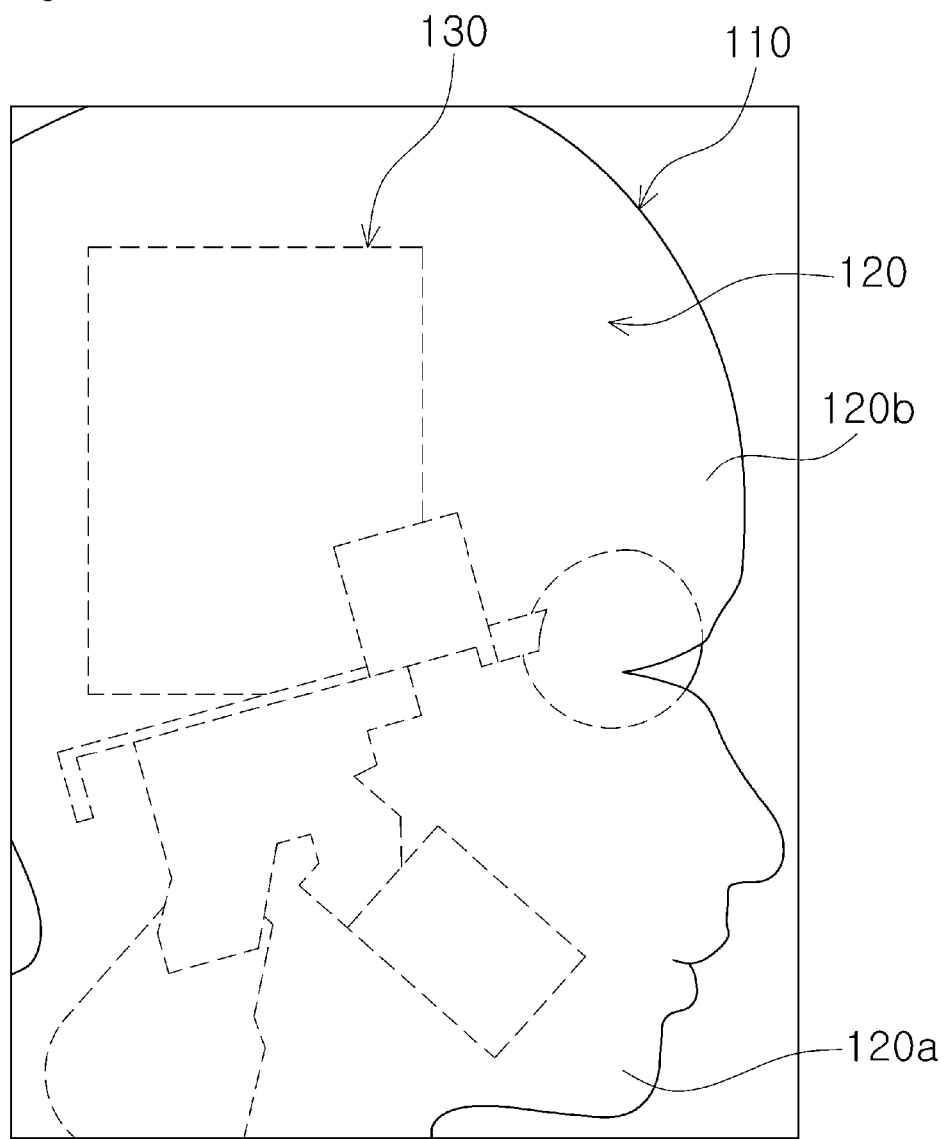
FIG. 1 shows a schematic construction of a common android face robot.
Figure 2:
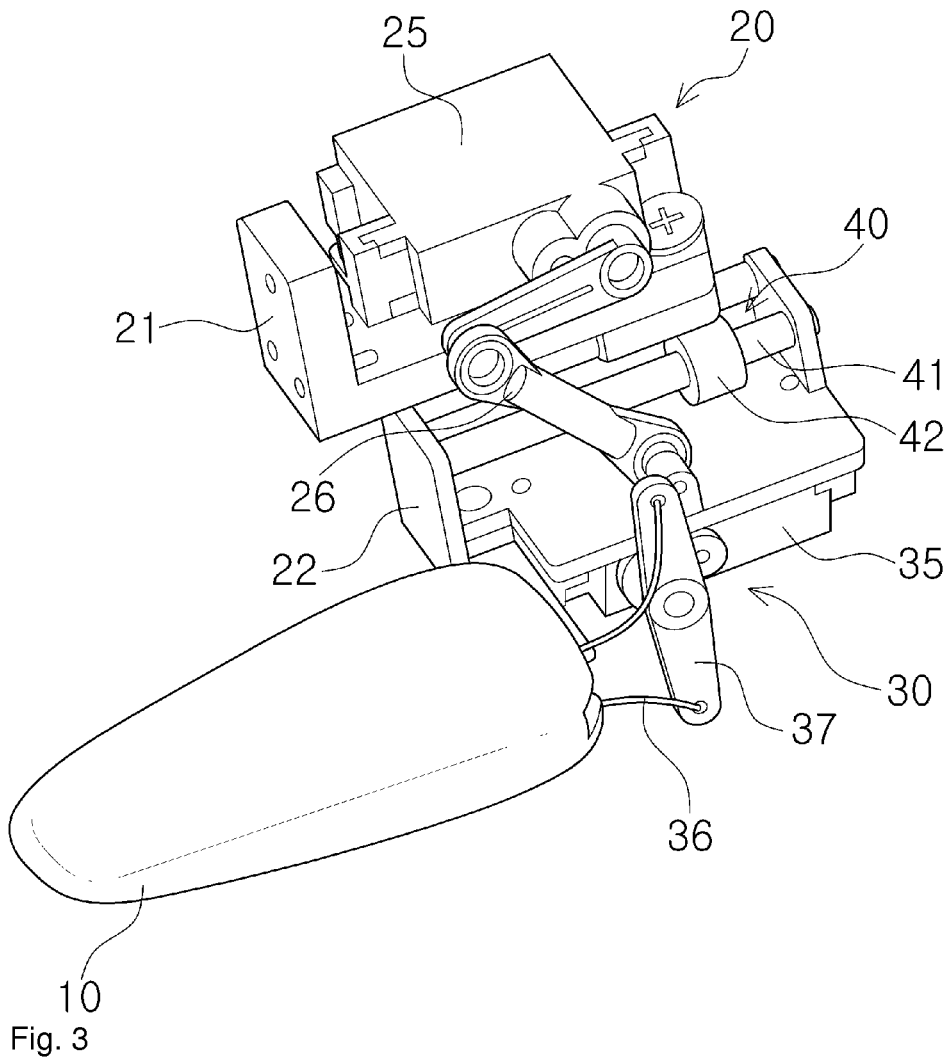
FIG. 2 is an external perspective view of a tongue module for a robot according to the present invention.
Figure 3:
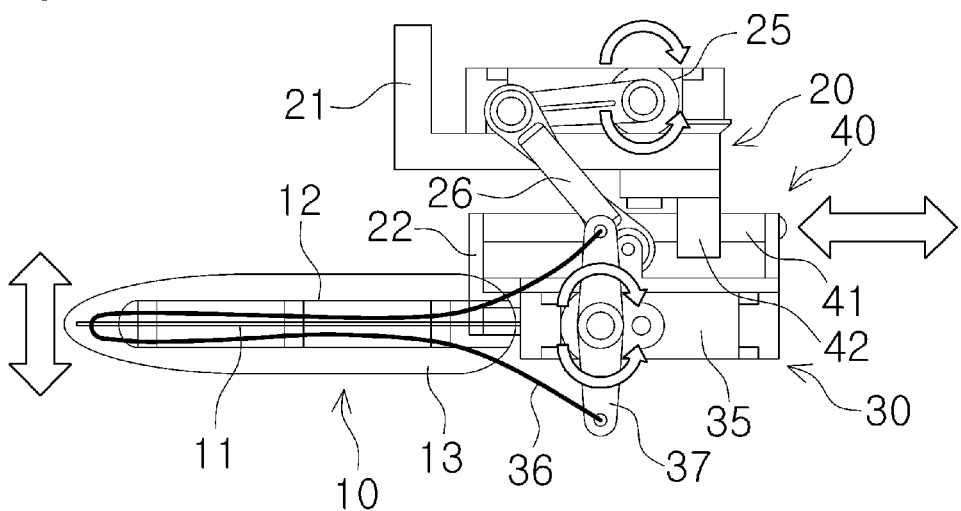
FIG. 3 shows the structure of the tongue module for a robot according to the present invention.
Figure 4:
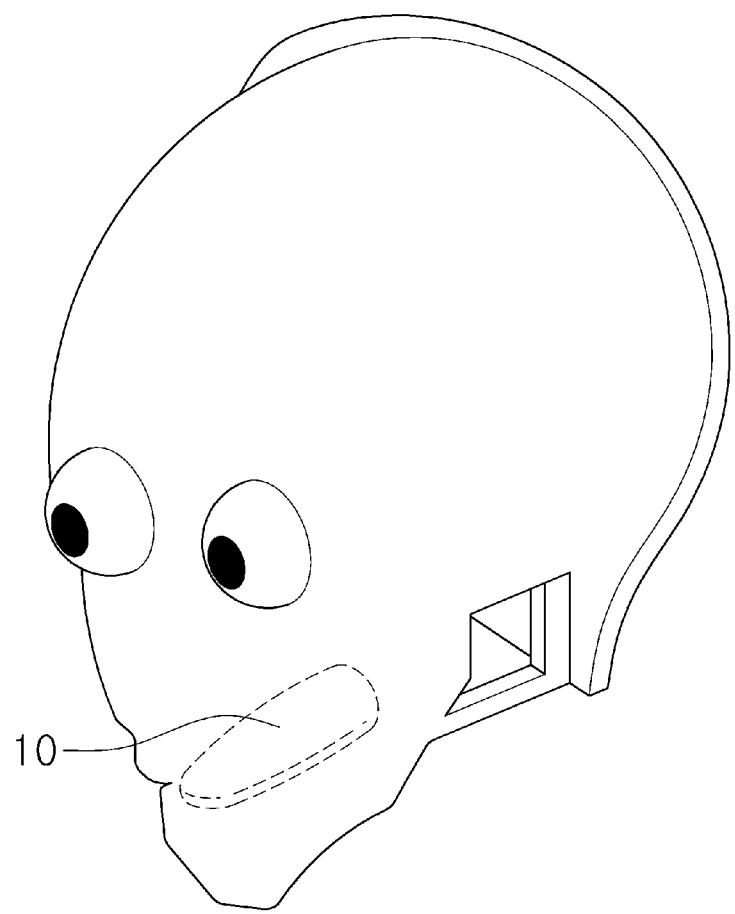
FIG. 4 is a conceptual diagram of an android face robot to which the tongue module for a robot according to the present invention is applied.
Figure 5:
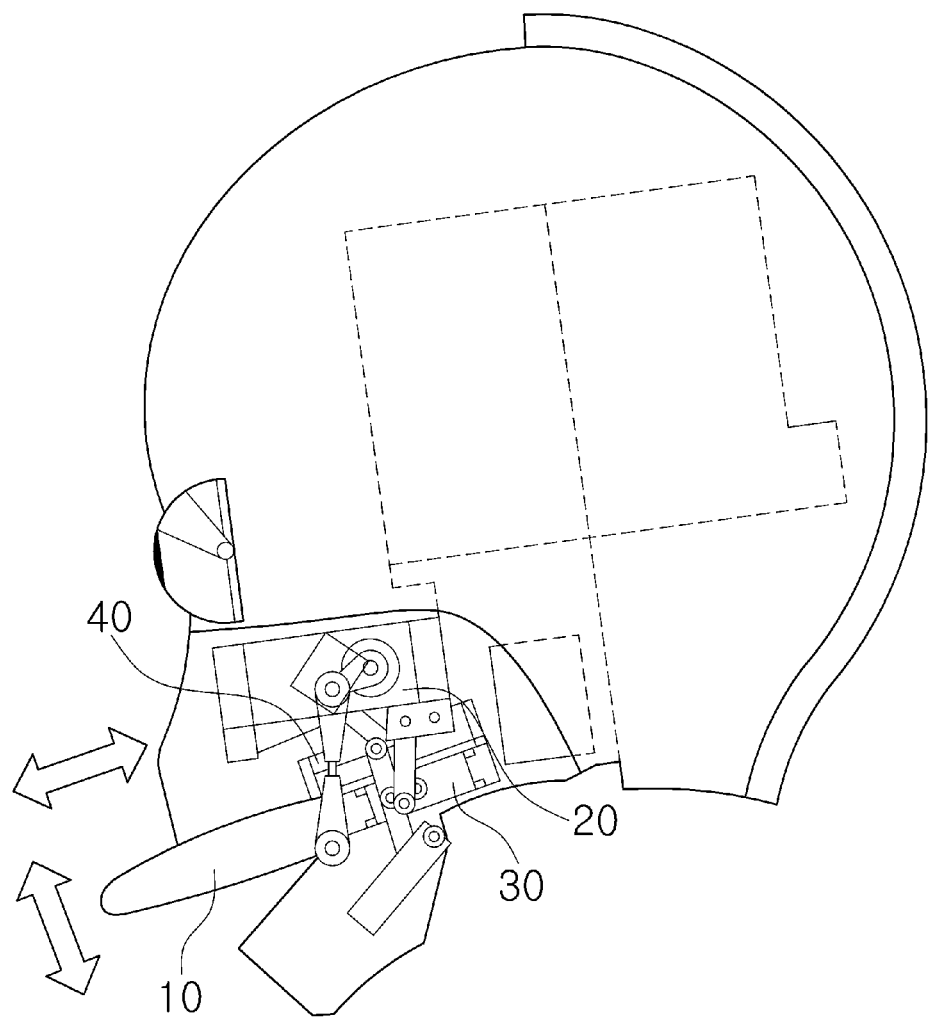
FIG. 5 shows a general outline of the tongue module in the android face robot to which the tongue module for a robot according to the present invention is applied.

The tongue module for a robot according to the present invention, as shown in FIGS. 2 and 3, a tongue body 10 made of composite silicon material and formed to have smooth texturing; a front and rear driving unit 20 configured to move the tongue body 10 in front and rear directions by using a crank arm 26 and a first servo motor 25; an up and down driving unit 30 configured to bend the tongue body 10 in up and down directions by using wires 36 and a second servo motor 35; and a linear rail assembly 40 configured to move the tongue body 10 in a straight line. As shown in FIGS. 4 and 5, the tongue module is installed in an android face robot formed to have a similar external appearance to a human face and to express feelings.

The tongue body 10 is configured to include a body frame 11 made of plastic material and formed to be bend, an outside skin 13 made of composite silicon material surrounding the body frame 11 and configured to form an external appearance of the tongue, and a plurality of angle control holders 12 formed in the body frame 11 at specific intervals and formed to fix the wires 36 so that the body frame 11 is bent in up and down directions.

The front and rear driving unit 20 includes the first servo motor 25 installed in a fixed bracket 21 included within a facial robot, the crank arm 26 configured to convert a rotational motion, generated by the first servo motor 25, into a straight-line motion so that the tongue body 10 is moved in front and rear directions, and a movable bracket 22 connected to the tongue body 10 and moved by the crank arm 26 in front and rear directions.

The up and down driving unit 30 includes a second servo motor 35 installed in the movable bracket 22, the wire 36 configured to surround the end part of the tongue body 10, engaged with the respective upper and lower sides of the angle control holders 12 provided in the tongue body 10 and configured to bend the tongue body 10 according to a position, and rotation arms 37 installed in the shaft of the second servo motor 35 and configured to have both ends connected to both ends of the wires 36.

The linear rail assembly 40 includes a linear guidance unit 42 installed in the fixed bracket 21 and a linear bar 41 installed in the movable bracket 22 and slidingly inserted into the linear guidance unit 42. In some embodiments, the linear guidance unit 42 may be installed in the movable bracket 22, and the linear bar 41 may be installed in the fixed bracket 21.

In the tongue module for a robot constructed as above according to the present invention, the tongue, together with a robot tongue joint, is moved, so that an android face robot can make more various facial expressions.

There are lots of limitations in implementing detailed motions of the tongue because a tongue is commonly an organ having most various motions from among the organs of a living thing. The tongue module is constructed to move in the degree of freedom of 2, such as push and pull, and up and down bending which are chiefly used in the motions of the tongue. The tongue body 10 is made of a silicon composite in order to implement the smooth texturing of the tongue.

The first servo motor 25 forming the front and rear driving unit 20 is driven in order to simulate the push and pull of the tongue. When the first servo motor 25 is driven, the crank arm 26 performs push and pull actions because the tongue body 10 is moved in front and rear directions. That is, the first servo motor 25 rotates the crank arm 26. When the crank arms 25 is rotated, the movable bracket 22 in which the tongue body 10 is installed is moved in front and rear directions, so that the tongue body 10 is moved in front and rear directions. Here, the linear rail assembly 40 provided between the movable bracket 22 and the fixed bracket 21 in which the first servo motor 25 is installed moves the movable bracket 22 in a straight line by using the linear guidance unit 42 and the linear bar 41. Since the tongue body 10 is pushed out of the mouth or pulled inside the mouth, the tongue is moved along with the joints of the jaws, thereby implementing various facial expressions.

Furthermore, the second servo motor 35 forming the up and down driving unit 30 is driven in order to simulate an action to bend the tongue up and down. When the second servo motor 35 installed in the movable bracket 22 is rotated, the rotation arm 37 having the wire 36 connected to its both ends is rotated. Accordingly, one end of the wire 36 is pulled by the rotation arm 37 and the other end thereof is released, so that the tongue body 10 is bent up and down.

At this time, the angle control holders 12 formed in the body frame 11 of the tongue body 10 at specific intervals limit the movement of the wire 26. When the body frame 11 of the tongue body 10 is bent by the limitation, the tongue body 10 is moved partially and entirely in up and down directions. Consequently, the tongue body 10, together with the tongue joint, makes facial expressions.

An example in which the first servo motor 25 and the second servo motor 35 are separately operated has been described so far. The first servo motor 25 and the second servo motor 35 may be independently operated in order to indicate the position of the tongue body 10 and the degree of bending of the tongue body 10. In an alternative embodiment, the first servo motor 25 and the second servo motor 35 may be operated at the same time in order to make more various facial expressions.

While the exemplary embodiment of the present invention has been described with reference to the accompanying drawings, it is evident to those skilled in the art that the present invention may be changed and modified in various ways without departing from the technical spirit of the present invention. Accordingly, the scope of the present invention should be interpreted based on the following appended claims. Accordingly, the present invention should be construed to cover all modifications or variations induced from the meaning and scope of the appended claims and their equivalents.

The invention claimed is:

1. A tongue module for a robot which is installed in an android face robot formed to have a similar external appearance to a human face and to express feelings, the tongue module comprising:
   a tongue body made of composite silicon material and formed to have smooth texturing;
   a front and rear driving unit including a crank arm and a first servo motor configured to move the tongue body in front and rear directions;
   an up and down driving unit including at least a wire and a second servo motor configured to bend the tongue body in up and down directions; and
   a linear rail assembly configured to move the tongue body in a straight line.

2. The tongue module for a robot according to claim 1, wherein the tongue body comprises:
   a body frame made of plastic material and formed to be bent,
   an outside skin made of composite silicon material surrounding the body frame and configured to form an external appearance of the tongue, and
   a plurality of angle control holders formed in the body frame at specific intervals and formed to fix the wires so that the body frame is bent in up and down directions.

3. The tongue module for a robot according to claim 1, wherein
   the first servo motor is installed in a fixed bracket included within a facial robot, the crank arm is configured to convert a rotational motion, generated by the first servo motor, into a straight-line motion so that the tongue body is moved in front and rear directions, and
   wherein the front and rear driving unit further includes a movable bracket connected to the tongue body and moved by the crank arm in front and rear directions.

4. The tongue module for a robot according to claim 3, wherein
   the second servo motor is installed in the movable bracket,
   the wire is configured to surround the end part of the tongue body, is engaged with the upper and lower sides of the angle control holders provided in the tongue body, and is configured to bend the tongue body according to a position, and
   wherein the up and down driving unit further includes a rotation arm installed in a shaft of the second servo motor and configured to have both ends connected to both ends of the wire.

5. The tongue module for a robot according to claim 3, wherein the linear rail assembly comprises:
   a linear guidance unit installed in one side of the fixed bracket and the movable bracket, and
   a linear bar ins tailed in the other side of the fixed bracket and the movable bracket and slidingly inserted into the linear guidance unit.

* * * * *